United States Patent Office 3,616,494
Patented Nov. 2, 1971

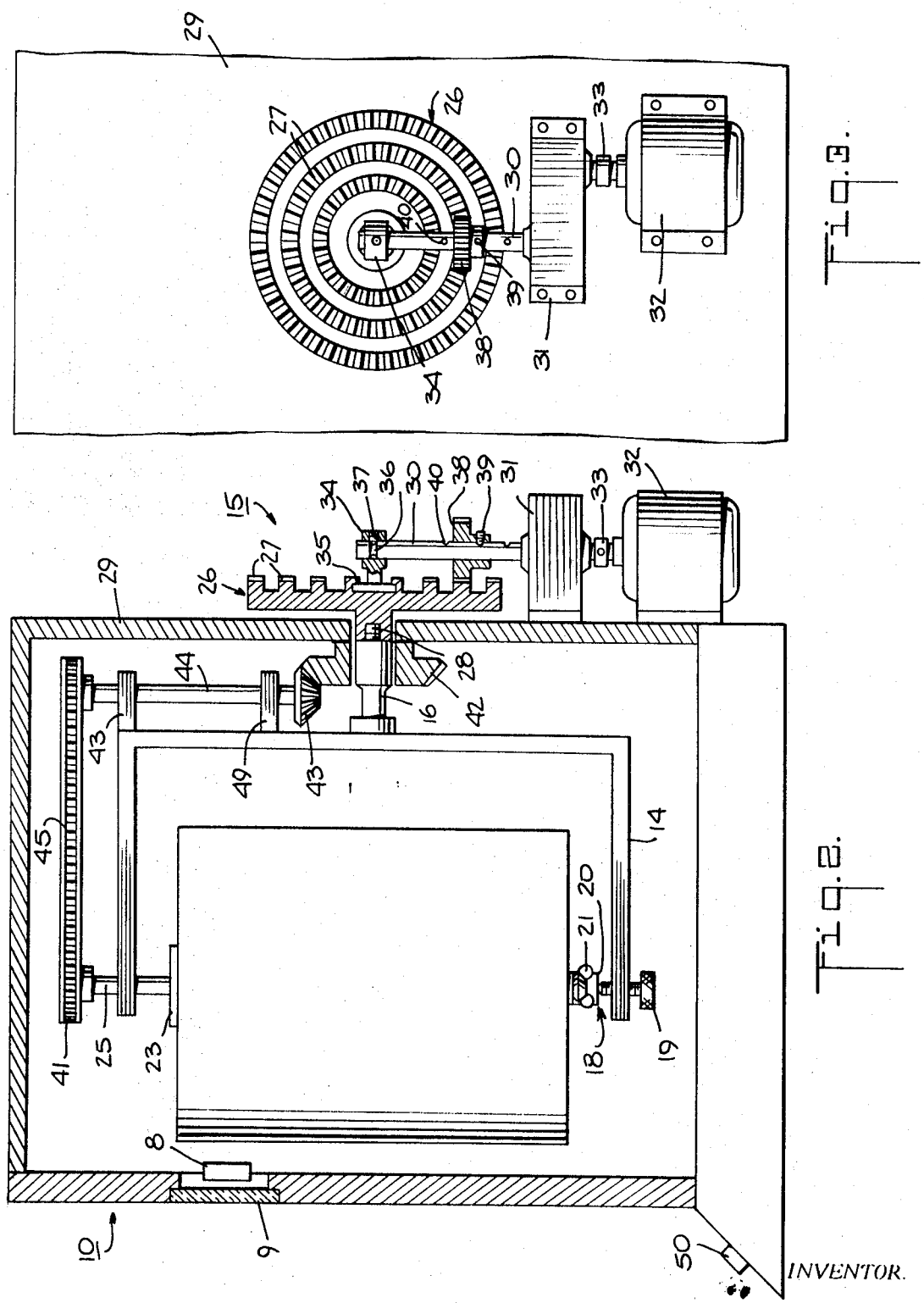

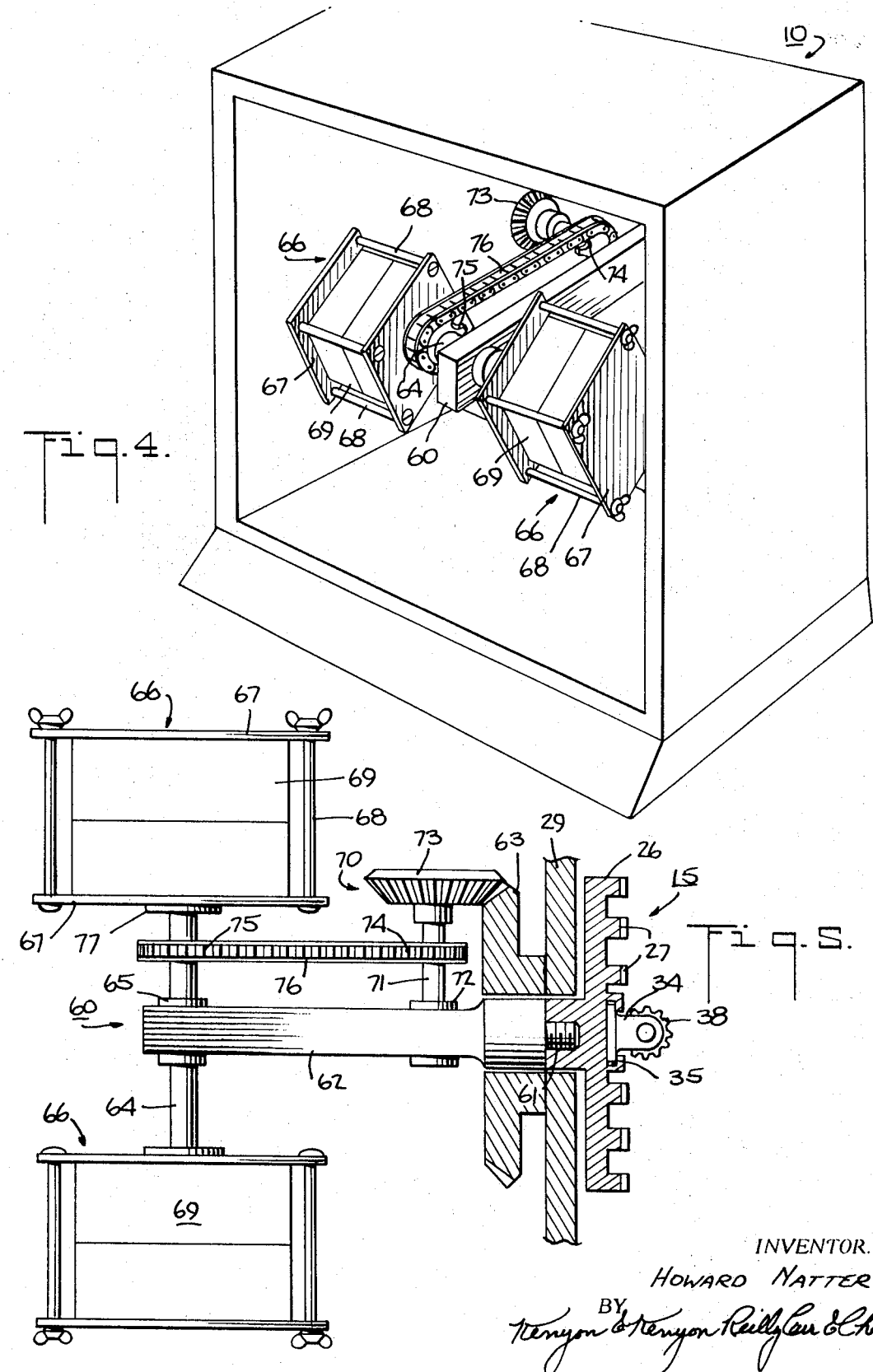

3,616,494
TEACHING APPARATUS FOR ROTATIONAL MOLDING OF PLASTICS MATERIALS
Howard Natter, 185 Grandview Blvd.,
Yonkers, N.Y. 10710
Filed Jan. 20, 1970, Ser. No. 4,245
Int. Cl. B29d 23/00; B29c 5/00
U.S. Cl. 18—26 RR       12 Claims

ABSTRACT OF THE DISCLOSURE

The apparatus is constructed so that the mold is rotated while the mold holder is also rotated. In this way, the plastic material which is contained within the mold is allowed to uniformly coat the inside surfaces of the mold and to solidify into the shape of the mold. A hollow molded plastic structure is thus obtained under gravity forces.

---

This invention relates to an apparatus for molding plastic articles. More particularly, this invention relates to an apparatus for molding hollow plastic articles.

Because of the continuing growth of the plastic field, there is a need to teach and train students and personnel in the various techniques for the manufacture of plastic articles. Along with this need is the related need of providing various educational devices which will facilitate the study and demonstration of the techniques. Such devices, however, must be capable of understanding and manipulation by students in order to convey the concepts being demonstrated. Consequently, it is necessary that the various devices used to demonstrate the techniques of plastic molding are of simple construction with working parts which are readily in view. That is, the devices have to be constructed so that a student can understand and use the machine as it is in operation and so that the student can visually inspect the device during operation. In this way the operation of the device will be more readily understood by the student and in that way the technique of the operation will become apparent.

Heretofore, various techniques have been utilized for molding plastic articles of hollow construction. In some cases, the articles have been formed by blow molding or injection molding techniques as are known, while in other instances one or more molds have been made to form a number of pieces which are subsequently sealed together into the completed article. However, in some instances, where the articles to be molded are too intricate, blow molding has not been used. Also, where the articles are very large, injection molding has not been used. Instead, rotational molding techniques have been employed. In these latter cases, powdered resins and liquid vinyls have been used. For example, a powdered resin has been placed in a mold and the mold is rotated in an oven. The heat generated within the oven plasticizes the resin while rotation causes an even coating on the inside of the mold due to gravity and heat transfer. After some time, the mold is cooled and removed from the oven so as to solidify the plastic.

Accordingly, it is an object of this invention to provide an apparatus for demonstrating plastic rotation molding techniques in a simple manner with allied necessary information displayed on indicating devices.

It is another object of this invention to convey the principles of plastic rotational molding techniques in a simple efficient manner, using various types of holders and rotating arms to demonstrate industrial and commercial techniques.

It is another object of this invention to provide an apparatus of relatively simple compact construction for demonstrating molding techniques.

It is another object of this invention to provide an apparatus of low cost construction for use in educational institutions to demonstrate rotational molding techniques.

It is another object of the invention to provide a working apparatus for molding plastic articles of hollow constructions.

Briefly, the invention provides an apparatus for demonstrating the techniques of rotational molding of plastics under the influence of gravity and heat transfer. The rotational molding apparatus comprises a housing which defines an enclosed space, a mold support which is rotatably mounted within the enclosed space of the housing and a drive means for rotating the mold support. In addition, at least one mold holding means is mounted on the mold support for holding a mold in place and an auxiliary drive means is connected between the drive means and the mold holding means to rotate the mold during rotation of the mold support. The effect of the two drive means is to impart two degrees of rotation to the mold being carried. Additionally, the machine includes suitable heating means or elements within the housing for heating of a mold mounted therein.

In one embodiment, the mold holding means is constructed with a yoke shaped member, for example of U-shape, and the drive means is mounted to the rear of the housing. This holder has a clamp on one end of the member and a pivot means on the other which are used to clamp or grip a mold or mold holder therebetween. The clamp is further connected to the auxiliary drive such that upon rotation of the mold support the auxiliary drive means causes the holding means to rotate the mold with respect to the holder.

In another embodiment, a pair of mold holding means are mounted on a rotatable mold support which is driven from the drive means located at the rear of the housing. The mold holding units cooperate with an auxiliary drive means which is connected to the mold support in a manner to cause rotation of the mold holding means during rotation of the mold support.

In these above embodiments, the mold which is placed within the mold holding means is rotated about two distinct axes. In the one case, the mold is rotated about a horizontal axis which passes between the front and rear of the housing. The second axis is located in a plane transverse to the first axis. Thus, upon rotation of the mold about this second axis with rotation about the first axis of rotation of the mold support, the various particles of plastic within the mold are subjected to gravity forces which continuously influence the mold particles to move in a downward path.

In order to mold an article by means of the above, a suitable mold is first provided with a charge of powdered plastic particles. The mold is then inserted into the mold holding means. The housing is then closed by means of a suitable door having a window therein and the apparatus is activated. The mold support is then rotated by the drive while the mold holding means is rotated by the auxiliary drive at the same time. Thus, the particles within the mold are continuously subjected to the force of gravity. Also, at the same time, heaters within the housing are actuated so as to heat the mold, and then the heat is transferred to the particles as they become plasticated into a molten flowable condition. Because of the influence of gravity and the molten state, the fluidized plastic coats the entire internal surface of the mold in a uniform manner to achieve substantially a uniform thickness of material across the interior surfaces of the mold. After a suitable time during which the particles of plastic have become molded into the shape defined by the mold, the mold is cooled and then the apparatus is deactivated and the mold is removed. The mold is then opened and the molded article therein is removed.

These and other objects of the invention will become more apparent from the following detailed description and the accompanied drawings in which:

FIG. 2 illustrates a fragmentary side view of the apparatus of FIG. 1;

FIG. 3 illustrates a partial view of the backwall and drive for the apparatus in FIG. 1;

FIG. 4 illustrates a modified embodiment of the apparatus of the invention; and

FIG. 5 illustrates the drive means for the mold support and mold holding means of the apparatus of FIG. 4.

Figure 1:
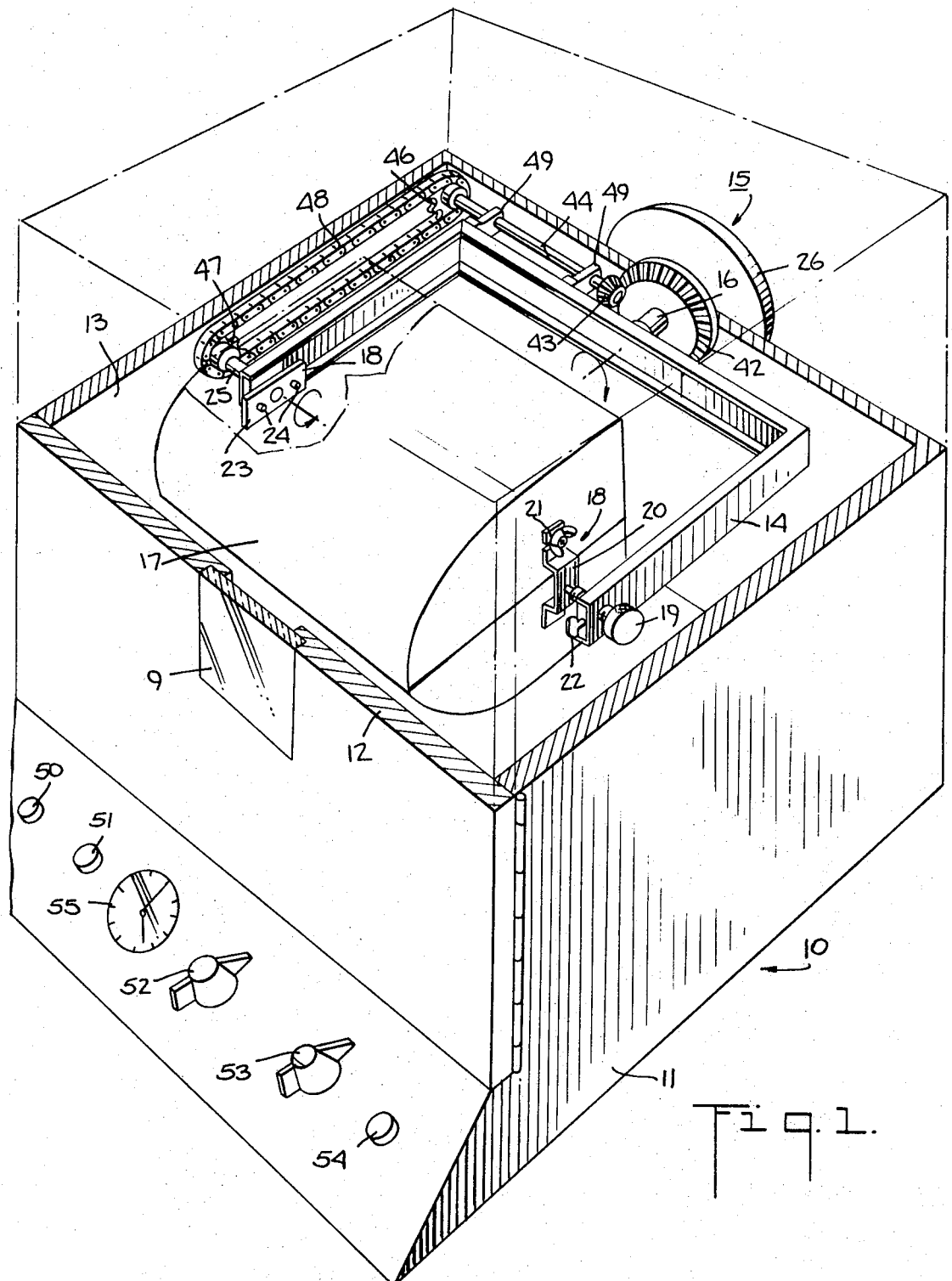
FIG. 1 illustrates a fragmentary perspective view of an apparatus according to the invention.

Referring to FIG. 1, the rotational molding apparatus 10 includes a housing 11 of substantially compact construction having a box-like configuration with a door 12 hinged at the front so as to close off an open wall leading into a chamber 13 defined by the housing 11. The door 12 includes a viewing Pyrex window 9 so as to permit viewing of the interior of the housing 11 while a dial thermometer 8 is mounted on the door 12 for viewing through the window 9. A mold support 14 is rotatably disposed within the chamber 13 of the housing 10 and is driven by drive means 15 located to the rear of the housing 10. The mold support 14 is constructed of a yoke shaped member, for example, of U-shape, having a pair of free ends facing towards the front of the housing 10 and an integral stub shaft 16 projecting towards the rear of the housing 10.

In order to mount a mold 17, for example, a split mold, within the yoke-shaped member 14, a suitable holding means 18 is provided at the ends of the member 14. The mold holding means 18 includes an adjustable pivot screw 19 which is threaded into one end of the member 14 and which abuts against a mounting clamp 20 secured by suitable means, such as threaded wing nuts 21, to outstanding threaded bolts on the mold 17. The screw 19 can be fixed in position by a set screw 22 located in the outer end of the member 14 which passes into the plane of the pivot screw 19. In addition, the mold holding means 18 includes a mounting clamp 23 on the other end of the yoked-shaped member 14. This clamp 23 has a pair of outstanding pins 24 for projecting into mating recess within the mold 17. These pins 24 serve to form a fixed connection with the mold 17 so as to ensure rotation of the clamp 23 with the mold 17. A shaft 25 projects from the clamp 23 outwardly to the opposite side of the member 14.

Referring to FIG. 2, the drive means 15 includes a gear wheel 26 of heavy mass in order to reduce any intermittent motion and provide a smooth uniform flywheel effect. The wheel 26 has a plurality of concentric rings of teeth 27 thereon and a stub shaft 28 which passes through the rear wall 29 of the housing 10. The stub shaft 28 which is rotatably mounted in the housing wall 29 has an internal recess which receives the stub shaft 16 of the yoked-shaped member 14 in fixed relationship. To this end, the stub-shaft 16 can be locked within the recessed shaft 28 by any suitable means, such as, a locking pin, threads, welding, and the like. The drive means 15 further includes a drive shaft 30 mounted transversely of the gear wheel 26 which is connected via a speed reducer 31 to a drive motor 32. The speed reducer 31 and the drive motor 32 are coupled together by a coupling 33 as is known and are both fixed to the rear wall 29 of the housing 10. The upper end of the shaft 30 is slidably mounted within a guide bushing 34 which is journalled within a central recess 35 of the gear wheel 26 so as to stabilize the upper end of the shaft. The upper end of the drive shaft 30 is also provided with a circumferential groove 36 while a threaded set screw 37 passes through the guide bushing 34 into the recess 36 so as to maintain the shaft 30 and guide bushing 34 in position with respect to each other while permitting rotation of the drive shaft 30. Further, in order to impart rotation from the drive shaft 30 to the gear wheel 36, a gear 38 is adjustably mounted on the drive shaft 30 in meshing engagement with a selective one of the rings teeth 27 on the gear wheel 26. This adjustable gear wheel 38 has a sleeve portion which carries a threaded set screw 39 which is adapted to pass into one of a plurality of slots 40 within the drive shaft 30 so as to fix the gear wheel 38 to the drive shaft 30 for rotation therewith.

The speed reducer 31 of the drive means 15 permits the speed of rotation of the drive shaft 30 to be changed accordingly with the type of molding being made. In addition, by selectively engaging the gear wheel 38 with different ones of the rings of teeth 27 on the gear wheel 26, the speed of rotation of the gear wheel 26 can be changed for a given input.

In addition to imparting one degree of rotation to the mold 17 by driving the yoke shaped frame member 16 via the drive means 15, an auxiliary drive means 41 is provided to impart a second degree of rotation to the mold 17. This auxiliary drive means 41 includes a bevel gear 42 fixedly mounted on the rear wall 29 of the housing 10 concentrically of the stub shafts 16, 28, a bevel gear 43 in meshing engagement with gear 42, a shaft 44 fixed to the bevel gear 43 and a chain conveyor 45 which is drivingly connected to the shaft 44. The gear 42 can also be formed with a bushing which is received in the wall 29 to journal the stub shaft 28 of the gear wheel 26 therein. The chain conveyor 45 includes a sprocket 46 which is fixed to the shaft 44, a toothed sprocket 47 which is fixed to the shaft 25 of the mounting plate 23 and an endless chain 48 which passes over the sprockets 46, 47. The shaft 44 is further rotatably mounted in a pair of brackets 49 fixed to the yoke shaped member 14.

Referring to FIG. 1, the housing 10 is further provided with suitable heating means (not shown) such as electrical heating coil elements which are used to heat up the interior chamber 13 of the housing 10 to various predetermined temperatures. The operation and temperature of the heating means is controlled by suitable knobs (FIG. 1) on the front wall of the housing 10. For example, one knob 50 can serve as a manual on-off switch for the heaters with a second adjustable knob 51 serving as a thermostatic control dial. In addition, a timer 52 of known construction is provided on the housing 10 to set the period of time for heating up the material in the housing 10. A manual on-off switch 53 for actuation of the motor 32 and an accompanying actuator button 54 can also be provided on the housing 11 to control the operation of the motor. Warning lights and the like can also be provided on the exterior of the housing to indicate when the apparatus is in use. A clock 55 can also be used with an indicator for determining elapsed time.

In operation, the mold 17 which is of split construction is filled with powdered resin or liquid vinyl or other suitable thermoplastic material. The mold 17 is then placed within the yoke member 14 and secured in place by the mold holding means 18. In this regard, it is noted that the mold holding means 18 is adjustable to hold various sizes of molds therein. For example, as shown, the mold 17 occupies substantially all of the space between the ends of the yoke shaped member 14. However, where a smaller mold is used, various types of shims or blocks can be used to take up the difference in space between the holding means 18 and the mold 17. Thereafter, the door 12 is closed and the drive motor 32 is actuated by the button 54 on the panel board of the housing 10. The drive motor 32 then imparts a rotational force to the shaft 30 via the speed reducer 31. Upon rotation of the shaft 30, the gear wheel 38 also rotates causing the gear wheel 26 to rotate via the meshing engagement with one of the rings of teeth 27.

As the gear wheel 26 rotates, the stub shaft 16 is caused to rotate thus imparting rotation to the yoke shaped member 14 about a horizontal axis passing from the rear to the front of the housing 10. This degree of rotation causes the mold 17 to rotate in a vertical plane. In addition, the gear 42 due to the fixed mounting on the wall 29 of the housing 10 imparts rotation to the gear 43 and shaft 44 and thus to the shaft 25 on the clamp 23. As the shaft 25 is rotatably mounted within the yoke 14 and carries the clamp 23 therewith, a second degree of rotation is imparted to the mold 17. Thus, the mold is also rotated about an axis which passes between the ends of the yoke shaped member transversely of the first axis of rotation. As a result, as the gear wheel 26 rotates, the mold 17 is subjected to two degrees of rotation. This permits the resin within the mold to be continuously subjected to movement due to gravity as the mold rotates slowly according to size.

At the same time that the drive motor 32 is actuated, or shortly thereafter, the heating elements within the housing 10 can be actuated to heat up the mold to a temperature sufficient to cause the powdered resin to plasticize. Thus, the plasticized material is allowed to coat the inside surfaces of the mold evenly with a substantially uniform thickness of material. Thus heating can be carried out for any suitable period of time, for example, from ten to thirty minutes for powdered plastics and from five to ten minutes for liquid vinyls. With vinyls, after the heating has been completed, the drive motor 32 is stopped, the heating elements are turned off and the mold can be removed for cooling purposes so that the hollow molded article can be removed from the mold.

With regard to the temperatures which are imparted to the mold 17, it is noted that where a vinyl plastisol is used, the material requires approximately 180° to gel and a temperature of about 300° F. to be cured. Other thermoplastic materials, such as powdered polyethylene however, can also be used in the mold, but the mold is cooled while rotating as this material will continue to flow until it attains a temperature below 250° F.

Referring to FIGS. 4 and 5, the rotational molder can also be constructed so as to form a pair of hollow molded articles. To this end, the housing 10 which is constructed in a similar manner to the above, rotatably supports a mold support 60 therein which is the form of an elongated bar. The mold support 60 has a section of circular cross-section 61 which passes through the rear wall 29 of the housing and a forward section 62 of rectangular shape. The mold support 60 is driven by the drive means 15 as described above. To this end, the mold support 60 has the circular end 61 threaded within a recess of the gear wheel 26 in a similar manner as above for rotation therewith. A shaft 64 is rotatably journaled within the end of the mold support 60 by a suitable sleeve bearing 65 and carries a pair of mold holding units 66 at the ends.

The mold holding units 66 are each constructed of a pair of plates 67 which are spaced apart by a plurality of spacer rods 68 so as to hold various split molds 69 between the plates 67.

An auxiliary drive means 70 is operably connected to the drive means 15 to impart a second degree of rotation to the mold holding units 66. This auxiliary drive means 70 includes a bevel gear ring 63 (similar to bevel gear 42 above) which is fixed to the rear wall 29 of the housing 10, a shaft 71 journalled at one end for rotation in the mold support 60 by a bearing 72 and which carries a bevel gear 73 at the other end in meshing engagement with the tooth bevel gear ring 63. In addition, a sprocket wheel 74 is fixed to the shaft 71 and a similar sprocket wheel 75 is fixed on the shaft 64 while a conveyor chain 76 passes over the sprockets 74, 75 so as to convey a rotational motion from the gear 73 to the shaft 64. Since the mold holding units 66 are fixed to the shaft 64 by the mounting plates 77, as by welding or threaded members, the mold holding unit 66 are caused to rotate along with the shaft 64.

In operation, upon rotation of the gear wheel 26 of the drive means, the mold support 60 is caused to rotate about a horizontal axis and thus imparts a first degree of rotation to the mold holding units 66 and molds 69 therein. In addition, since the gear ring 63 is fixed to the rear wall 29 of the housing 10, the gear 73 walks about the periphery of the gear ring 63 causing rotation of the shaft 71 relative to the mold support 60 as well as rotation of the shaft 64 with respect to the mold support 60. As a result, a second degree of rotation is imparted to each of the mold holding units 66 about an axis passing through the shaft 64 and being transverse to the first axis of rotation. These two degrees of rotation, as above, cause the plastic material within the molds to coat the internal surfaces of the molds in a uniform manner.

It is noted that the molds which can be used with the above described apparatus are such as to permit the molding of hollowed articles. To this end, the molds can be made of split construction, that is, in two halves each of which is symmetrical to the other. The molds further have internal surfaces which conform to the design external shape of the article to be molded.

It is further noted that the invention utilizes gravity to form the hollow molds and as such imparts no strain on the plastic material being molded as would be the case under centrifugal forces.

The invention further provides an apparatus which is of relatively low cost construction so as to be utilized within various educational institutions such as in industrial arts shops. The apparatus allows for a wide variety of material and molds to be used to demonstrate rotational molding techniques. Also, due to its compact construction, the apparatus can accommodate a relatively large number of students per class period.

It is noted that the door of the housing of the apparatus can be provided with a suitable window to permit viewing of the internal working of the apparatus. Because of this, a student can easily visualize the operation of the apparatus so as to more fully understand the principle of rotational molding.

It is also noted that different holder arms can be inserted into the gear of the drive means to obtain different drive mechanisms. This is evident from a comparison of FIG. 2, wherein the gear wheel 26 is shown driving the yoke member 14 through the stub shaft 16 with FIG. 5, wherein the gear wheel 26 is shown directly driving the mold support 60. In both applications, an interchangeable coupling between the gear wheel 26 and the mold support is effected through an internally threaded socket in the gear wheel which mates with a threaded shank of either the stub shaft 16 or the mold support 60.

What is claimed is:

1. An apparatus for molding hollow plastic articles comprising
    a housing;
    a mold support rotatably disposed within said housing;
    drive means adapted to be connected to the mold support for rotating said mold support about an axis;
    said drive means including a gear wheel having a plurality of concentric rings of teeth and means for selectively engaging one of said rings for changing the speed of rotation of said mold support;
    at least one mold holding means on said mold support for holding a mold; and
    auxiliary drive means for rotating said mold holding means with respect to said mold support, said auxiliary drive means being operably connected to said drive means for actuation therewith to synchronize rotation of said mold holding means and said mold support whereby a mold held within said holding means is subjected to two degrees of rotation upon actuation of said drive means.

2. An apparatus as set forth in claim 1 wherein said auxiliary drive means includes a chain conveyor mounted on said mold support and a gear fixed to said housing said gear being in operative engagement with said chain conveyor.

3. An apparatus as set forth in claim 1 wherein said drive means further includes a shaft mounted to the exterior of said housing and carrying said means for selectively engaging one of said rings, and a drive motor for rotating said shaft.

4. An apparatus as set forth in claim 3 wherein said means for selectively engaging one of said rings is a gear adjustably mounted on said shaft.

5. An apparatus as set forth in claim 1 wherein the gear wheel is of heavy mass to maintain a flywheel effect as said mold holding means rotates.

6. An apparatus as set forth in claim 1 wherein the mold support is removably secured to the gear wheel.

7. An apparatus for the teaching of rotational molding techniques, said apparatus comprising a housing, drive means adapted to rotate a mold about an axis, a plurality of interchangeable mold supports, each mold support having means for being selectively drivingly engaged by the drive means for rotation about an axis, each of said mold supports including mold holding means to accommodate molds of a type different from each other mold support, and individual drive means carried by each mold support for rotating the mold holding means with respect to the mold support, and means operably connecting each of the individual drive means to the mold support drive means only when the mold support is in driving engagement with its drive means for simultaneous actuation therewith, whereby instruction in various techniques of rotational molding of molds of differing types may be achieved through the use of a single apparatus.

8. An apparatus constructed in accordance with claim 7 wherein the means of each mold support for selective engagement with the drive means includes a threaded coupling between the drive means and each of the mold supports.

9. An apparatus constructed in accordance with claim 8 wherein the threaded coupling includes means forming a threaded socket in the drive means and a matingly threaded shank projecting from a portion of each of the mold supports.

10. An apparatus constructed in accordance with claim 9 wherein the drive means includes a gear wheel positioned in coaxial alignment with a selected mold support, the coupling selectively interconnecting the gear wheel and the selected mold support.

11. An apparatus constructed in accordance with claim 7 wherein one of the mold supports is yoke shaped, the mold holding means of said yoke shaped mold support including mold engaging means, and means journalling said mold engaging means in the yoke shaped mold support near opposed ends of the yoke, the individual drive means being operably connected to one of the mold engaging means, whereby a mold may be rotatively carried by the yoke shaped mold support between the mold engaging means.

12. An apparatus constructed in accordance with claim 11, wherein another of the mold supports is shaped as an elongated bar having a free end, the opposite end of the bar shaped mold support being in selective engagement with the drive means, the mold holding means of said bar shaped mold support including mold engaging means extending from opposite faces of the bar shaped mold support adjacent the free end means coaxially journalling the mold engaging means in the bar shaped mold support about an axis perpendicular to the axis of the bar shaped mold support whereby a plurality of molds may be simultaneously carried.

References Cited

UNITED STATES PATENTS

| 3,388,429 | 6/1968 | Barnett et al. | 18—26 RR |
| 3,416,193 | 12/1968 | Freeborn | 18—26 RR |
| 3,275,733 | 9/1966 | Schule et al. | 18—26 RR X |
| 3,309,439 | 3/1967 | Nonweiler | 18—26 RR UX |
| 3,315,314 | 4/1967 | Barnett et al. | 18—26 RR |
| 3,095,260 | 6/1963 | Ferriot | 18—26 RR X |
| 3,454,988 | 7/1969 | Cremer | 18—26 RR |
| 3,337,662 | 8/1967 | Spencer | 18—26 RR X |
| 2,573,693 | 11/1951 | De Bell | 18—26 RR |
| 3,381,631 | 5/1968 | Hornlein et al. | 18—26 RR X |

J. HOWARD FLINT, Jr., Primary Examiner